March 19, 1968 SHOUICHI SANO 3,373,833
COMPACT MOTOR CAR CONSTRUCTION
Filed Feb. 9, 1965 2 Sheets-Sheet 1
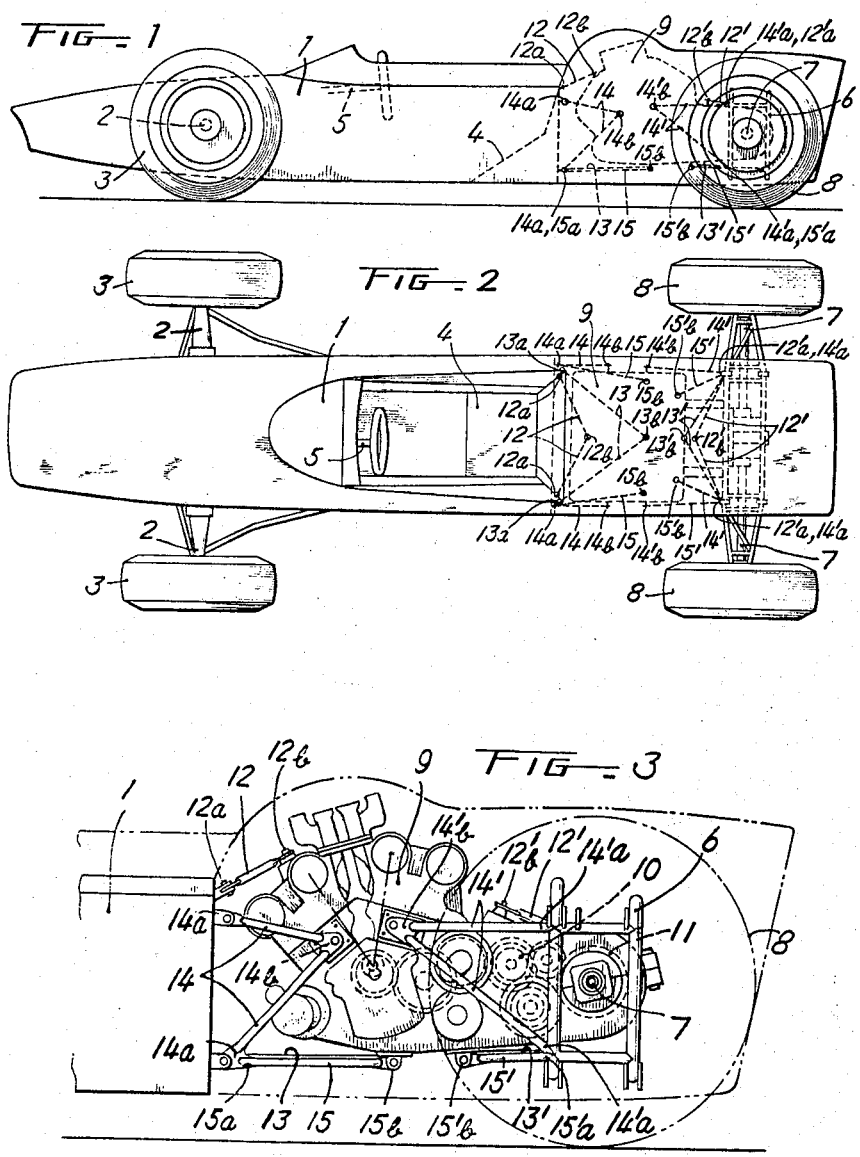
INVENTOR
SHOUICHI SANO
BY
Linton and Linton
ATTORNEYS

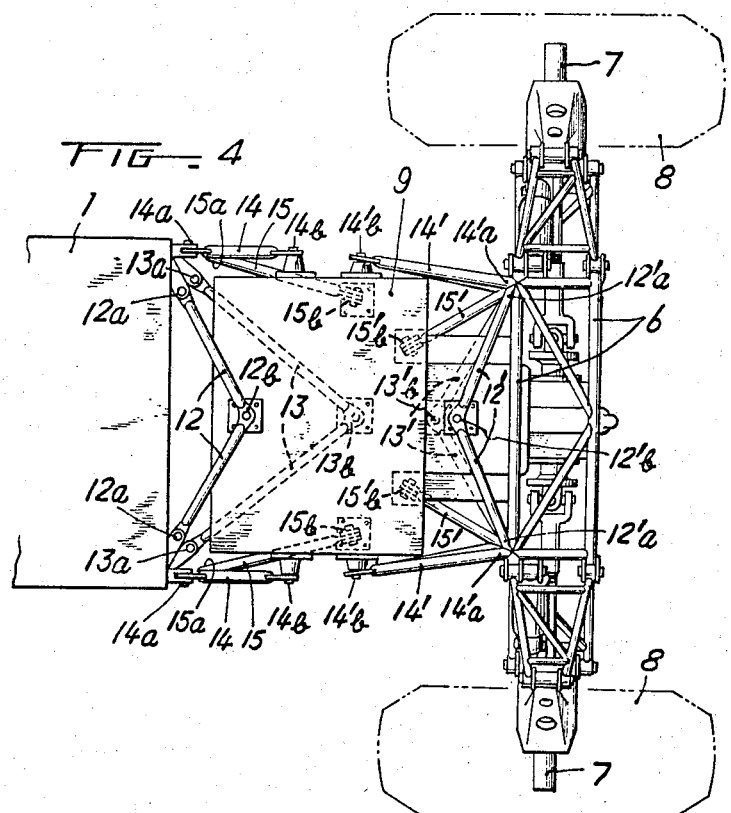
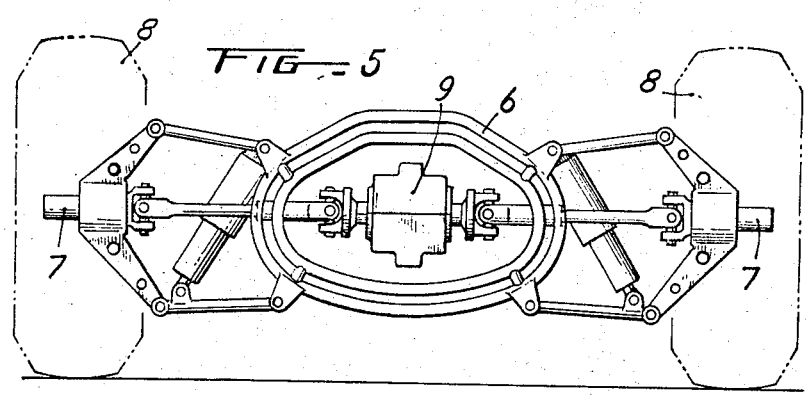

3,373,833
COMPACT MOTOR CAR CONSTRUCTION
Shouichi Sano, Saitama-ken, Japan, assignor to Kabushiki
 Kaisha Honda Gijutsu Kenkyusho, Saitama-ken, Japan,
 a corporation of Japan
Filed Feb. 9, 1965, Ser. No. 431,322
Claims priority, application Japan, July 31, 1964,
39/42,971
2 Claims. (Cl. 180—54)

The present invention relates to a motor car, and has for its principal object to provide a motor car which can use a prime mover comparatively larger in proportion to the size of a car body but the motor car can be made as a whole small in size and weight for being suitable, for example, as a racer.

According to the present invention, a front car body portion having front wheels and a rear car body portion having rear wheels are connected integrally one with another through an engine unit disposed between the two portions, so that the engine unit serves as a strengthening member for the car body.

One embodying example of the present invention will be explained with reference to the accompanying drawings, wherein;

FIG. 1 is a side elevation of a motor car embodying the present invention,

FIG. 2 is a top plan view of the same,

FIG. 3 is an enlarged side view of an engine connecting portion of the motor car.

FIG. 4 is a top plan view thereof, and

FIG. 5 is a back side view of the same.

A front car body portion 1 is provided with an axle-shaft 2 and front wheels 3 and also with a seat 4 and a steering rod 5, and a rear car body portion 6 is provided with an axle-shaft 7 and rear wheels 8.

An internal combustion engine 9, which is integrally combined with a power transmission mechanism comprising a speed change mechanism 10 and a differential gear mechanism 11, FIG. 3, is disposed between the front and rear car body portions 1 and 6, and the front and rear car body portions are connected integrally and rigidly by a number of brackets as described more in detail hereinafter, so that the engine 9 is connected to the axle-shaft 7 of the rear wheels 8 for transmitting rotation thereto.

The brackets connecting between the engine 9 and the front car body portion 1 comprise an upper bracket 12, a lower bracket 13, a pair of upper side brackets 14, 14, and a pair of bottom side brackets 15, 15. Similarly, the brackets connecting the engine 9 and the rear car body portion 6 comprise an upper bracket 12', a lower bracket 13', a pair of upper side brackets 14' and 14', and a pair of bottom side brackets 15' and 15'.

The upper bracket 12 and the lower bracket 13 are each V-shaped and are fixed at both their ends 12a, 12a and 13a, 13a, to the upper and lower portions of the front car body portion, and are fixed at their top ends 12b and 13b to the top and bottom of the engine 9.

Similarly, the upper bracket 12' and the lower bracket 13' are, respectively, V-shaped and are fixed at both their ends 12'a, 12'a and 13'a, 13'a to the upper and lower portions of the rear car body portion 6, and are fixed at their top ends 12'b and 13'b to the engine 9.

The upper side bracket 14 connected between the engine 9 and the front car body portion on each side surface is V-shaped and is fixed at both its ends 14a and 14a to the front car body portion 1 and at its top end 14b to the engine 9.

Similarly, each of the upper side brackets 14' and 14' which is V-shaped is fixed at both its ends 14'a and 14'a to the rear car body portion 6 and at its top end 14'b to the engine 9. The bottom side bracket 15 on each side is connected at its base end 15a to the base ends of the side bracket 14 and is fixed at its top end 15b to the bottom surface portion of the engine 9. Similarly, each of the bottom side brackets 15', which extend integrally at its base end 15'a from the base end of the side bracket 14'a is firmly fixed at its top end 15'b to the bottom surface portion of the engine.

It is usual in the conventional car body construction to have the front wheels and the rear wheels attached to one common body frame, and the engine is loaded on a platform of the body frame. In this type of car body construction, the car body frame is long and it requires the use of comparatively large structural members for reinforcing purposes. Additionally, in such a car, it is necessary to have the external form of the engine loading portion in comparison with the external form of the prime power itself.

According to the present invention, however, the engine itself is constructed as a structural member of the car body, between the front and rear car body portions, and these are connected integrally so that the engine may serve as a strengthening structural member for the car body. Accordingly, a platform structure for supporting the engine can be omitted, and the overall volume and the weight can be diminished because no other connecting member is needed. Additionally, the engine itself serves as a strengthening structural member for every direction, so that the strength of the car body can be increased. Additionally, it becomes easy to place the engine at a comparatively lower position, whereby the center of gravity of the car body can be lowered.

I claim:

1. In a compact motor car construction, a car body comprising a front car body portion, a rear car body portion spaced longitudinally of the motor car from said front car body portion, a driving engine positioned between said front car body portion and said rear car body portion, a set of V-shaped brackets, extending between said front car body portion and said driving engine and attached at their ends to said front car body portion and at their apex to the top, sides and bottom of said driving engine, and a second set of V-shaped brackets extending between said rear car body portion and said driving engine and attached at their ends to said rear car body portion and at their apex to the top, sides and bottom of said driving engine whereby said front car body portion, rear car body portion, engine and said sets of brackets provide a rigid car body.

2. In a compact motor car construction, a car body comprising a front car body portion, a rear car body portion spaced longitudinally of the motor car from said front car body portion, a driving engine positioned between said front car body portion and said rear car body portion, a plurality of brackets extending between and rigidly connecting said front car body portion and said engine including a set of V-shaped brackets attached at their ends to said front car body portion and at their apex to the top, sides and bottom of said driving engine and a pair of brackets each attached to one of said V-shaped brackets attached to a side of said driving engine and to the bottom of said engine and a second plurality of brackets extending between and rigidly connecting said engine and said rear body portion including a second set of V-shaped brackets attached at their ends to said rear car body portion and at their apex to the top, sides and bottom of said driving engine and a second pair of brackets each attached to one of said second set of V-shaped brackets attached to a side of said driving engine and to the bottom of said engine whereby said front car body portion, rear car body portion, driving engine and brackets provide a rigid car body.

References Cited

UNITED STATES PATENTS

| | | | |
|---|---|---|---|
| 2,091,652 | 8/1937 | Porsche | 180—54 |
| 2,572,911 | 10/1951 | Brown | 180—54 X |
| 2,932,102 | 4/1960 | Blomquist | 180—54 X |

FOREIGN PATENTS

| | | |
|---|---|---|
| 546,370 | 8/1922 | France. |
| 152,979 | 4/1921 | Great Britain. |
| 503,514 | 1939 | Great Britain. |

BENJAMIN HERSH, *Primary Examiner.*

MILTON L. SMITH, *Examiner.*